United States Patent [19]
Eida et al.

[11] 4,138,506
[45] Feb. 6, 1979

[54] METHOD FOR DEODORIZING SOYBEAN MILK OBTAINED FROM SOYBEANS OR DEFATTED SOYBEANS

[75] Inventors: Toshiaki Eida; Yasuhiro Saito; Tomiji Saito; Chobe Yomoto, all of Kanagawa; Yutaka Nakajima, Tokyo, all of Japan

[73] Assignee: Meiji Seika Kaisha, Ltd., Tokyo, Japan

[21] Appl. No.: 818,705

[22] Filed: Jul. 25, 1977

Related U.S. Application Data

[63] Continuation of Ser. No. 635,836, Nov. 28, 1975, abandoned.

[51] Int. Cl.$^2$ .......................... A23C 11/00; A23L 1/20
[52] U.S. Cl. .................................... 426/598; 210/40; 260/123.5; 426/431; 426/488
[58] Field of Search ............... 426/431, 486, 488, 598, 426/507; 260/123.5; 210/39, 40

[56] References Cited

U.S. PATENT DOCUMENTS

| | | | |
|---|---|---|---|
| 2,546,903 | 3/1951 | Morrell | 210/39 X |
| 3,436,343 | 4/1969 | Smith | 210/39 X |
| 3,436,344 | 4/1969 | Cunning et al. | 210/39 |
| 3,454,404 | 7/1969 | Watanabe | 260/123.5 |
| 3,635,726 | 1/1972 | Sair | 426/431 |
| 3,642,490 | 2/1972 | Hawley et al. | 426/488 X |
| 3,645,745 | 2/1972 | Magnino, Jr. et al. | 260/123.5 |
| 3,662,672 | 5/1972 | Huer | 260/123.5 |
| 3,966,702 | 6/1976 | Carey | 260/123.5 |

OTHER PUBLICATIONS

Yau-Lai Lo et al., "Concentration of Soymilk" *Food Technology*, Aug. 1968, pp. 96-98 (vol. 22, 1029).

*Primary Examiner*—Richard V. Fisher
*Assistant Examiner*—Steve Alvo
*Attorney, Agent, or Firm*—Sughrue, Rothwell, Mion, Zinn and Macpeak

[57] ABSTRACT

A method for deodorizing soybeans or defatted soybeans which comprises extracting soybeans or defatted soybeans with water to obtain soybean milk, adding a sulfurous acid reducing agent, with sodium sulfite being preferred, to the soybean milk in an amount of from about 1500 to about 4000 ppm based on the total solids content of the soybean milk in the case of soybeans, or about 200 to about 1000 ppm based on the total solids content of the soybean milk in the case of defatted soybeans, heating at high temperature for a short period of time under pressure, quenching the heated soybean milk, and treating the cooled milk with activated carbon to adsorb odorous components and the remaining sulfurous acid reducing agent thereon.

5 Claims, No Drawings

METHOD FOR DEODORIZING SOYBEAN MILK OBTAINED FROM SOYBEANS OR DEFATTED SOYBEANS

This is a continuation of application Ser. No. 635,836 filed Nov. 28, 1975 and now abandoned.

BACKGROUND OF THE INVENTION

1. Field of the Invention

This invention relates to a treatment for substantially completely removing odor and flavorous components inherent to soybean milk from soybeans or defatted soybeans without denaturation of proteins therein.

2. Description of the Prior Art

For the purpose utilizing soybeans as a foodstuff, various research has been made on treatments for removing soybean odor by a physical, chemical or biological means. For example, the deodorizing treatment proposed in Japanese Patent Publications Nos. 70/1973 and 2332/1973 has been noted as promising, wherein soybean milk is treated in superheated dry steam under high pressure followed by treating under reduced pressure. However, this known treatment is premised on the belief that odorous components are vaporized, and therefore, is disadvantageous in that only vaporizable substances are removed, while substances which are difficult to vaporize remain in the system.

Other physicochemical treatments which have been conventionally adopted tend to denature soybean proteins due to the heating temperature and time involved. Therefore, these conventional treatments are also unfavorable from an industrial standpoint.

SUMMARY OF THE INVENTION

Extensive research has been performed by the present inventors on a process for producing deodorized soybeans which can be utilized as a foodstuff by relatively simple treating steps, eliminating the above described disadvantages associated with the prior art.

The process according to the present invention comprises adding a sulfurous acid reducing agent to soybean milk obtained as an extract from soybeans or defatted soybeans, heating the soybean milk at high temperature for a short period of time under pressure using, for example, a plate-type heat exchanger followed by quenching using, for example, a plate-type heat exchanger, and treating with activated carbon to obtain a deodorized material. If desired, the material obtained can be concentrated and dried.

It should be understood, of course, that the exact apparatus utilized to heat or quench in accordance with the present invention is not overly important so long as it permits the high temperature/pressure conditions of the heating to be achieved and thereafter permits a rapid cooling (quenching). While a plate-type heat exchanger is given as illustrative, one skilled in the chemical engineering art will appreciate that equivalent apparatus can appropriately be selected.

The present invention is characterized in that the heating at high temperature under pressure for a short period of time in the presence of a sulfurous acid reducing agent releases, or renders the odor and flavorous components inherent to soybeans releasable from the soybean proteins, whereby the released or releasable odorous components and remaining reducing agent can be removed by treating with activated carbon.

The heating according to the present invention should be effected at high temperature under pressure for a short period of time, and the heat-treated soybean milk should be quenched to rapidly reduce the possibility of denaturation of soybean proteins.

As a result of further research, the inventors found that re-adsorption of the released odorous components onto or into the proteins can effectively be prevented when the sulfurous acid reducing agent is added to soybean milk prior to heating in such an amount that any unreacted reducing agent remaining in the system after the heating treatment can be removed by the treatment with activated carbon.

That is, the present invention provides a treating method with unexpected results by quenching the material after heating to reduce the possibility of denaturation of soybean proteins as much as possible, and also to prevent the released odorous components from being re-adsorbed onto the proteins due to residual sulfurous acid.

DETAILED DESCRIPTION OF THE INVENTION

The first step of the present invention comprises extracting soybeans or defatted soybeans having a high watersoluble protein content from water in a conventional manner to obtain soybean milk.

The amount of the water used in the extraction is controlled so that the resulting soybean milk has a solids content of from about 5 to about 10%, preferably 7 to 8%, by weight based on the total weight of the soybean milk. The upper limit of the amount of the water is based on ease of treatment with activated carbon after the heating treatment, whereas the lower limit is set by economic considerations to permit one to conduct the optional treatments of concentration and drying, which are performed in a conventional manner, if desired. Further, as long as the extraction is carried out using water in the above recited range, the subsequent heating treatment at high temperature for a short period of time does not greatly affect the properties which are inherently possessed by soybean proteins contained in the milk, such as the nitrogen solubility index, water-redispersibility and the like.

According to the present invention, a sulfurous acid reducing agent is incorporated into the soybean milk prior to the heating. The quenching treatment after the heating should be rapidly carried out in order not to reduce the nitrogen solubility index and the like, which are barometers for functions inherently possessed by soybean porteins. By "rapidly carrying out" is meant that the quicker the soybean milk can be quenched after the heating, the better. As a practical matter, on an industrial scale the soybean milk is merely taken from the heating means and immediately transferred to the quenching means so that, essentially, the soybean milk is introduced into the quenching means at substantially the temperature at which it was maintained in the heating means.

Where the quenching after the heating is conducted without using the sulfurous acid reducing agent, it was found that the odor inherent to soybeans and a part of the flavorous components tended to be re-surrounded by soybean proteins and retained therein. This indicates that the presence of the sulfurous acid reducing agent prevents the retention of the odor and flavorous components by the soybean proteins. It is believed that the sulfurous acid reducing agent acts on soybean proteins in cooperation with the heating treatment to weaken the attractive forces between the molecular chains of the soybean proteins, and the thus weakened forces do not increase in the subsequent quenching, whereby the soybean proteins are prevented from re-surrounding and retaining the released odor and flavorous components.

The sulfurous acid reducing agents which can be used in the present invention can include sulfurous acid, sulfurous anhydride, sulfites such as sodium sulfite, hyposulfites such as sodium hyposulfite, meta bisulfites such as sodium meta bisulfite and the like, with sodium sulfite being preferred.

The exact method of adding the sulfurous acid reducing agent(s) to the soybean milk is not overly important, so long as a good mixture is obtained. Generally, it is most convenient to dissolve the sulfurous acid reducing agent in a small amount of water and mix the resulting solution with the soybean milk.

As previously described, the amount of the sulfurous acid reducing agent can be defined as being within the range that can be removed by adsorption onto activated carbon, and therefore, the exact amount used depends on the kind of reducing agent employed. Generally, however, when soybeans are used as the raw material, the amount of the reducing agent added is relatively large in comparison with the case of using defatted soybeans as a raw material. For example, when sodium sulfite is used as a reducing agent, the amount added ranges from about 150 to about 200 weight ppm based on the weight of the total solids of the water-containing milk (solids content, about 5 to 10% by weight) containing the above recited water content, i.e., about 1500 to about 4000 weight ppm based on the total solids of the soybean milk in the case of using soybeans as a raw material, and from about 20 to about 50 ppm based on the weight of the water-containing soybean milk, i.e., from about 200 to about 1000 ppm based on the total solids of the soybean milk, in the case of using defatted soybeans as the raw material.

The second step according to the present invention can be carried out by heating the soybean milk at high temperature under pressure for a short period of time in the presence of the above described reducing agent. A combination of a temperature of from about 100 to about 160° C. and a heating period of from about 1 to about 60 seconds is suitable from the standpoint of the flavor score or appeal of the end product and the maintenance of functions naturally possessed by soybean proteins, such as nitrogen solubility index and the like. When the heating is carried out at temperatures as high as about 115° to about 160° C., a suitable heating period is then from about 1 to about 5 seconds. The pressure of heating generally ranges from about 2 to about 6 Kg/cm$^2$ gauge.

Immediately after the heating under pressure for a short time, the heated soybean milk is rapidly cooled, generally to about 15° to about 40° C., preferably 15° to 25° C.

In the third step according to the present invention, the cooled soybean milk is treated with, if desired, activated carbon, preferably using a column filled with, for example, activated carbon. Further, it is preferred to employ granular activated carbon having a particle size of not less than 0.5 mm because the odor and flavorous components can be effectively adsorbed thereon, and granular activated carbon is easy to reactivate and re-use. In addition, fine powders of activated carbon are inevitably present with general activated carbon. By the treatment with granular activated carbon, relatively low molecular weight odor and flavorous components which have been released or rendered easily releasable from the protein portion of the soybeans by the heating can be adsorbed onto/into the surfaces and the pores of the granular activated carbon, while the proteins are discharged from the column without being adsorbed on the activated carbon. Further, unreacted reducing agent remaining in the system is also adsorbed on the activated carbon substantially completely, and therefore, is not present in the final product.

The treatment with activated carbon is generally performed at a temperature of from about 15 to about 25° C., most preferably 15 to 18° C., utilizing a space velocity from about 1 to about 10, most preferably from 4 to 8.

A flavor evaluation test was carried out to establish and demonstrate the deodorizing effects obtained by the treatment according to the present invention. The standards used for evaluation were according to the scales used in the method by Moser et al., which have been adopted by the North Area Institute of the Agricultural Department, U.S.A. [Proceedings of International Conference on Soybean Protein Foods Held at Peoria, Ill, Oct. 17–19, 1966, Agricultural Research Bureau of the Agricultural Department, U.S.A., 285 pr. (1967)]. The standards are shown below.

| Scale | Evaluation on Flavor |
| --- | --- |
| 10 | Bland |
| 9 | |
| 8 | Weak |
| 7 | |
| 6 | |
| 5 | Moderate |
| 4 | |
| 3 | Strong |
| 2 | |
| 1 | Very Strong |

The results obtained in this evaluation test as conducted by 10 specialized panels are shown in the Examples hereinafter given. According to the results, those samples prepared according to the method disclosed in Japanese Patent Publications Nos. 70/1973 and 2332/1973 were evaluated as 4 to 5, whereas the samples prepared according to the present invention were evaluated as 8 to 9, indicating an obvious superiority of the present invention. Furthermore, when comparing the results obtained by only treating unheated soybean milk with granular activated carbon (in this case odorous components cannot sufficiently be removed), it is obvious that the present invention has an excellent effect.

The present invention will now be illustrated in greater detail with reference to the following Examples, but it should be understood that they are given for illustrative purposes only and are not to be construed as limiting the present invention. In the Examples, all parts, percentages, ratios and the like are by weight, unless otherwise indicated.

EXAMPLE 1

Raw soybeans were washed with cool or warm water of 10° to 40° C. and immersed in cool water of about 10° C. for one night followed by draining. Tap water was added to the resulting soybeans in an amount about 3 times the weight of the soybeans, and the resulting raw material was then subjected to a treatment with a grinder. The resulting slurry was then adjusted to a pH of 7.0 by adding a sodium hydroxide solution and stirred at 40° C. for 30 minutes, followed by centrifuging in a conventional manner to obtain soybean milk having a solids content of 10% by weight. 200 ppm of sodium sulfite based on the total weight of the soybean milk was added thereto, and the resulting soybean milk stirred to mix the same homogeneously. The mixture was heated at a temperature of 150° C. for 1 second at 4 Kg/cm$^2$ gauge using a plate-type heat-exchanger, and immediately thereafter cooled to a temperature of 25° C. using a cooled plate-type heat-exchanger. The cooled mixture was adjusted to a pH of 7.2 (since highly acidic pH values induce coagulation of the proteins in the soybean milk, operation at a pH near neutral is preferred) with an aqueous solution of sodium hydroxide and then passed through a column packed with granular activated carbon (Adstar, a product of Futamura Chemical Ltd., Japan; having a pore size distribution mainly in the pore size range from about 70 to about 150 A; size greater than 0.5 mm in diameter) at a pH of 6.8 (substantially neutral) and at a temperature of 15° C. with a space velocity of 10. The effluent was concentrated on a plate-type evaporator and spray dried in a conventional manner to obtain white powdery soybean milk having the odor and flavorous components inherent to soybean removed therefrom.

As earlier described, a flavor evaluation test by 10 panels was conducted, and the results obtained are shown in Table 1 below. For comparison, control samples were prepared according to the treatment as indicated in Table 1.

Table 1

| Sample No. | Treatment | Scale |
|---|---|---|
| 1 | No Treatment (as extracted from raw soybeans) | 1.0 |
| 2 | Extracted from raw soybeans and steam dried by super heating under high pressure | 4.0 |
| 3 | Extracted from raw soybeans and treated with granular activated carbon | 2.0 |
| 4 (present invention) | Example 1 | 8.0 |

EXAMPLE 2

9 parts of warm water at 40° C. was added to 1 part of defatted soybean flakes (defatted in a conventional manner at low temperature), and the resulting mixture was adjusted to a pH of 6.8 with an aqueous solution of sodium hydroxide while stirring. After the pH adjustment, the stirring was further continued for 30 minutes at 40° C. followed by centrifuging in a conventional manner to obtain soybean milk having a solids content of 8% by weight. To the thus obtained milk was added potassium sulfite in an amount of 28 ppm based on the total weight of the mixture, i.e., 350 ppm based on the total solids of the soybean milk, followed by stirring to mix the system homogeneously. The resulting mixture was then heated at a temperature of 130° C. for a period of 2 seconds at a pressure of about 2 Kg/cm$^2$ gauge using a shell and tube type heat-exchanger, and immediately thereafter cooled to 23° C. using a cooled plate-type heat exchanger. The cooled mixture was worked up in the same manner as described in Example 1 to obtain white powdery soybean milk having the odor and flavorous components inherent to soybeans removed therefrom.

Using the same control samples as were used in Example 1, an evaluation test by 10 panels was conducted; the results are shown in Table 2 below.

Table 2

| Sample No. | Scale |
|---|---|
| 1 | 1.2 |
| 2 | 5.0 |
| 3 | 3.0 |
| 5 (present invention Example 2) | 9.0 |

The powders of the soybean milk as prepared in Examples 1 and 2 were found to have a nitrogen solubility index of greater than about 95%.

While the invention has been described in detail and with reference to specific embodiments thereof, it will be apparent to one skilled in the art that various changes and modifications can be made therein without departing from the spirit and scope thereof.

What is claimed is:

1. A method for deodorizing soybean milk obtained from soybeans or defatted soybeans which consists essentially of the steps, conducted sequentially of (1) extracting soybeans or defatted soybeans with water to obtain soybean milk, (2) adding a sulfurous acid reducing agent selected from the group consisting of sodium sulfite and potassium sufite to said soybean milk in an amount of from about 1500 to about 4000 ppm based on the total solids of the soybean milk in the case of extracting soybeans in step (1) or in an amount of from about 200 to about 1000 ppm based on the total solids of the soybean milk in the case of extracting defatted soybeans in step (1), to form a mixture with said soybean milk, (3) heating the mixture at a temperature ranging from about 100° to about 160° C. for a period from about 1 to about 60 seconds at a pressure of from about 2 to about 6 Kg/cm$^2$ gauge, (4) quenching the heated mixture to a temperature of from about 15° to about 40° C., (5) contacting the cooled mixture with activated carbon to adsorb odorous components and remaining sulfurous acid reducing agent from said mixture, and (6) recovering said soybean milk.

2. The treatment according to claim 1, wherein said heating is at a temperature of from 115° to 160° C. for a period of from 1 to 5 seconds.

3. The treatment according to claim 1, wherein said activated carbon is granular.

4. The treatment according to claim 3, wherein said cooled mixture is contacted with the granular activated carbon at a space velocity of from about 1 to about 10 and at a temperature of from about 15 to about 25° C.

5. The treatment according to claim 3, wherein said granular activated carbon has a pore size distribution mainly in the pore size range from about 70 to about 150 A, and a particle size greater than 0.5 mm in diameter.

* * * * *